United States Patent
Ritter et al.

(10) Patent No.: US 7,911,176 B2
(45) Date of Patent: Mar. 22, 2011

(54) SYSTEMS AND METHODS INVOLVING PERMANENT MAGNET ELECTRIC MACHINE ROTOR POSITION DETERMINATION

(75) Inventors: Allen Michael Ritter, Roanoke, VA (US); Rajib Datta, Niskayuna, NY (US); Luis J. Garces, Niskayuna, NY (US); Xianghui Huang, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 378 days.

(21) Appl. No.: 12/182,337

(22) Filed: Jul. 30, 2008

(65) Prior Publication Data
US 2010/0026226 A1 Feb. 4, 2010

(51) Int. Cl.
*H02P 23/00* (2006.01)
(52) U.S. Cl. .................. 318/809; 318/799; 318/490
(58) Field of Classification Search .............. 318/809, 318/799, 490, 400.02, 400.17, 723, 722
See application file for complete search history.

(56) References Cited

U.S. PATENT DOCUMENTS

| | | | |
|---|---|---|---|
| 5,327,053 A | | 7/1994 | Mann et al. |
| 5,371,458 A | * | 12/1994 | Heikkila ................. 324/772 |
| 6,369,541 B1 | | 4/2002 | Albert |
| 2002/0125783 A1 | | 9/2002 | Morinigo |
| 2007/0252587 A1 | | 11/2007 | Stauder et al. |

FOREIGN PATENT DOCUMENTS

| | | |
|---|---|---|
| DE | 10311028 A1 | 10/2004 |
| EP | 0793337 A2 | 9/1997 |

OTHER PUBLICATIONS

European Search Report for EP Application No. 09166035; Search Report completed Oct. 8, 2009.

* cited by examiner

*Primary Examiner* — Karen Masih
(74) *Attorney, Agent, or Firm* — Cantor Colburn LLP

(57) ABSTRACT

A method for determining rotor position comprising sending a signal to a stator, receiving a first signal indicative of a first estimated stator inductance, and receiving a second signal indicative of a second estimated stator inductance. The method further includes, calculating a first rotor position angle using a function including the first estimated stator inductance and the second estimated stator inductance.

16 Claims, 4 Drawing Sheets

SYSTEMS AND METHODS INVOLVING PERMANENT MAGNET ELECTRIC MACHINE ROTOR POSITION DETERMINATION

BACKGROUND OF THE INVENTION

The subject invention relates to determining the position of a rotor in a machine such as a motor or a generator. More particularly, the subject invention relates to determining the position of a rotor by identifying an axis of magnetization.

Identifying the axis of magnetization of a machine allows the control of a power flow in the machine. Machines that use rotors with permanent magnets often use sensors to identify the axis of magnetization. Sensors increase the complexity of a system, and may be undesirable. Combining Terminal voltage and line current into an estimation of machine EFLUX allows for the identification of the axis of magnetization. The determination of machine EFLUX to identify the axis of magnetization is effective while the machine is operating at high speeds because the machine has a readily measurable EFLUX, however as the Machine terminal voltage decreases with the decrease in speed of the machine, the effectiveness of the determination is reduced. When the machine is stationary, and there is no machine terminal voltage related to related to the speed, and a determination of rotor position using terminal voltage to indirectly measure EFLUX is ineffective.

U.S. Pat. No. 6,401,875 teaches method to used such described change in inductance to identify axis of magnetization, the method does not teach mean to detect other than zero speed and restricts stimulas to apriory shape and is not readily extensible to less predefined waveshape as would be anticipated in zero current regulation for instance.

Therefore, a system and method that allows the identification of the axis of magnetization of a stationary high as well as low speed machine is desired.

BRIEF DESCRIPTION OF THE INVENTION

An exemplary method for determining rotor position comprising sending a signal to a stator, receiving a first signal indicative of a first estimated stator inductance, and receiving a second signal indicative of a second estimated stator inductance. The method further includes, calculating a first rotor position angle using a function including the first estimated stator inductance and the second estimated stator inductance.

An exemplary embodiment includes an electrical machine system comprising a stator, and a controller. The controller is operative to send a signal to a stator, and receive a first signal indicative of a first estimated stator inductance, receive a second signal indicative of a second estimated stator inductance, and calculate a first rotor position angle using a function including the first estimated stator inductance and the second estimated stator inductance.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

In the following detailed description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, well known methods, procedures, and components have not been described in detail.

Further, various operations may be described as multiple discrete steps performed in a manner that is helpful for understanding embodiments of the present invention. However, the order of description should not be construed as to imply that these operations need be performed in the order they are presented, or that they are even order dependent. Moreover, repeated usage of the phrase "in an embodiment" does not necessarily refer to the same embodiment, although it may. Lastly, the terms "comprising," "including," "having," and the like, as used in the present application, are intended to be synonymous unless otherwise indicated.

Measuring the terminal flux of a machine such as a motor or a generator to determine rotor position is effective while the terminal voltage in the machine is relatively high. When a machine has low machine terminal voltage, such as, for example when the machine is operating at a low speed, or when the machine is stationary, using machine terminal voltage to determine rotor position may be ineffective.

Figure 1:
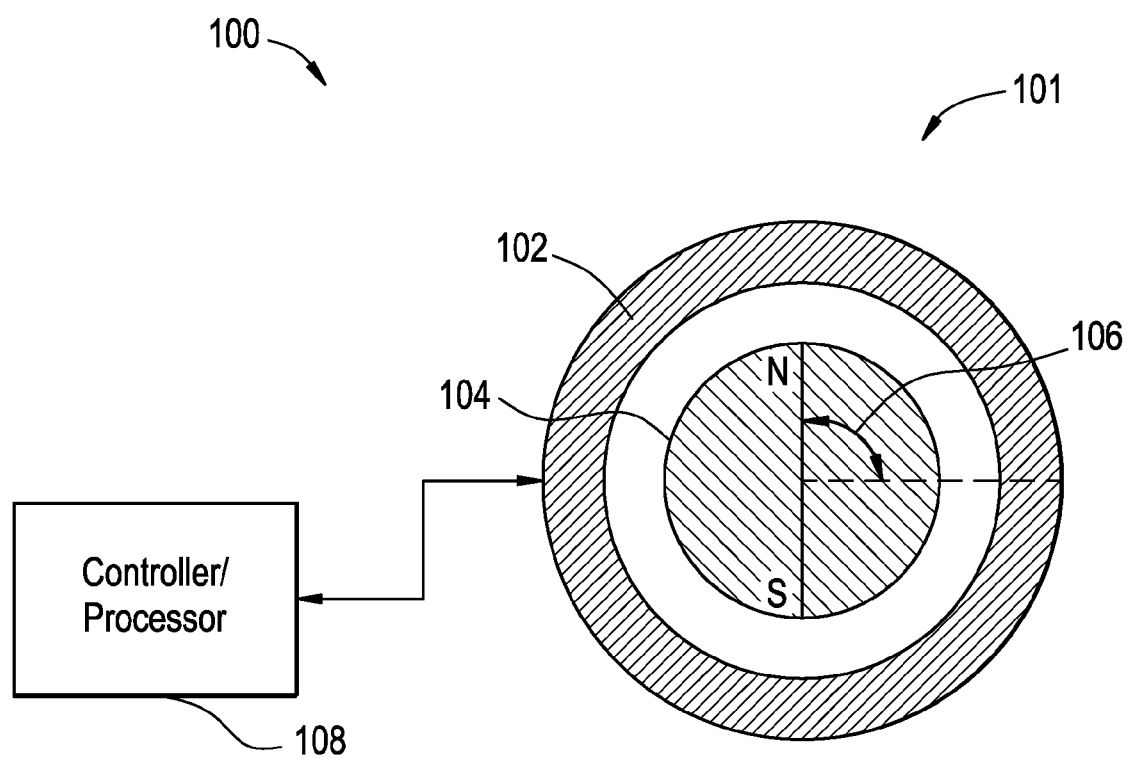
FIG. 1 illustrates an exemplary embodiment of an electrical machine system.

FIG. 1 illustrates an exemplary embodiment of an electrical system 100. The system 100 includes an electrical machine 101, that may be, for example a motor or a generator. The machine 101 includes a stator 102 and a rotor 104. The machine 101 is connected to a controller 108 having a processor. The rotor 104 has a north and a south pole. FIG. 1 shows an angle 106 that may be used to calculate an angular position of the rotor 104 relative to the stator 102.

Previous methods for determining the position of the rotor 104 calculate positions of axes of magnetization in the rotor 104 by calculating the back electromagnetic flux (eFlux) of the stator 102. When the machine 101 operates, a back eFlux results. The back eFlux may be calculated by measuring the voltage and current in stator 102. Once the back eFlux is known, the angular position of the rotor 104 may be determined. However, as the machine speed decreases, back eFlux decreases, and the effectiveness of calculating the position of the rotor 104 using back eFlux is reduced. When the machine is stationary, there is no back eFlux in the machine. Thus, using back eFlux to determine a position of the rotor 104 is ineffective.

Figure 2:
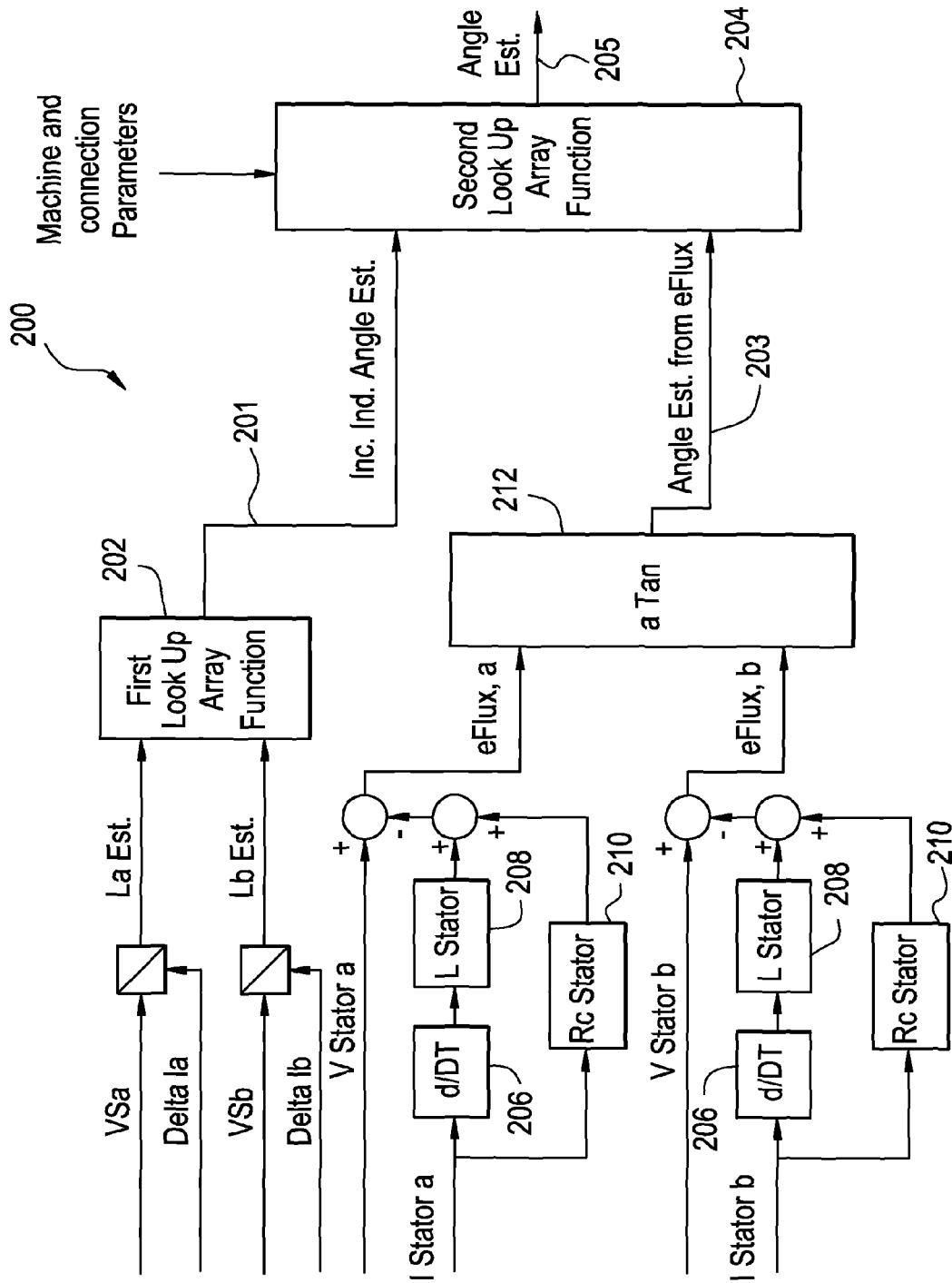
FIG. 2 illustrates an exemplary embodiment of a block diagram of a method for determining rotor position in the system illustrated in FIG. 1.

FIG. 2 illustrates a block diagram of an exemplary method 200 for determining the angular position of the rotor 104 (of FIG. 1). The method may be performed by, for example, a processor in the controller 108. The method 200 includes sending a signal to the stator 102 from the controller 108. The signal may be, for example, a pulse width modulated signal. The signal results in measurable voltages and currents in the stator 102. The resultant voltages are shown in FIG. 2 as Voltage-second alpha (VSa) and Voltage-second beta (VSb).

Figure 4:
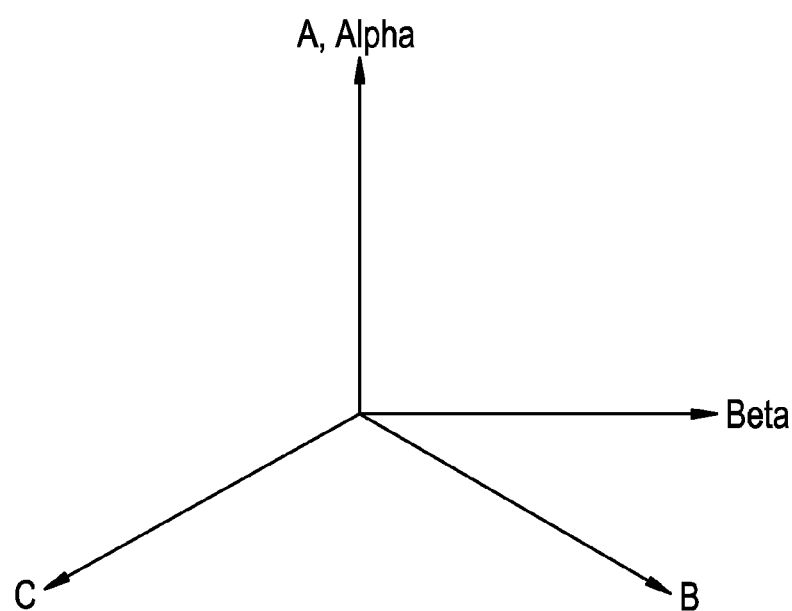
FIG. 4 illustrates an example of the spatial relationship of axis used in the method.

The resultant currents I-alpha and I-beta are measured over time to determine changes in the currents giving delta I-alpha (Delta Ia) and delta I-beta (Delta Ib). The VS values are divided by the Delta I values to give estimated incremental inductance values (La Est. and Lb Est.). The La Est. and Lb. Est. enter a first look up array function in block 202. FIG. 4 illustrates an example of the spatial relationship between the axis used in the method.

Figure 3:
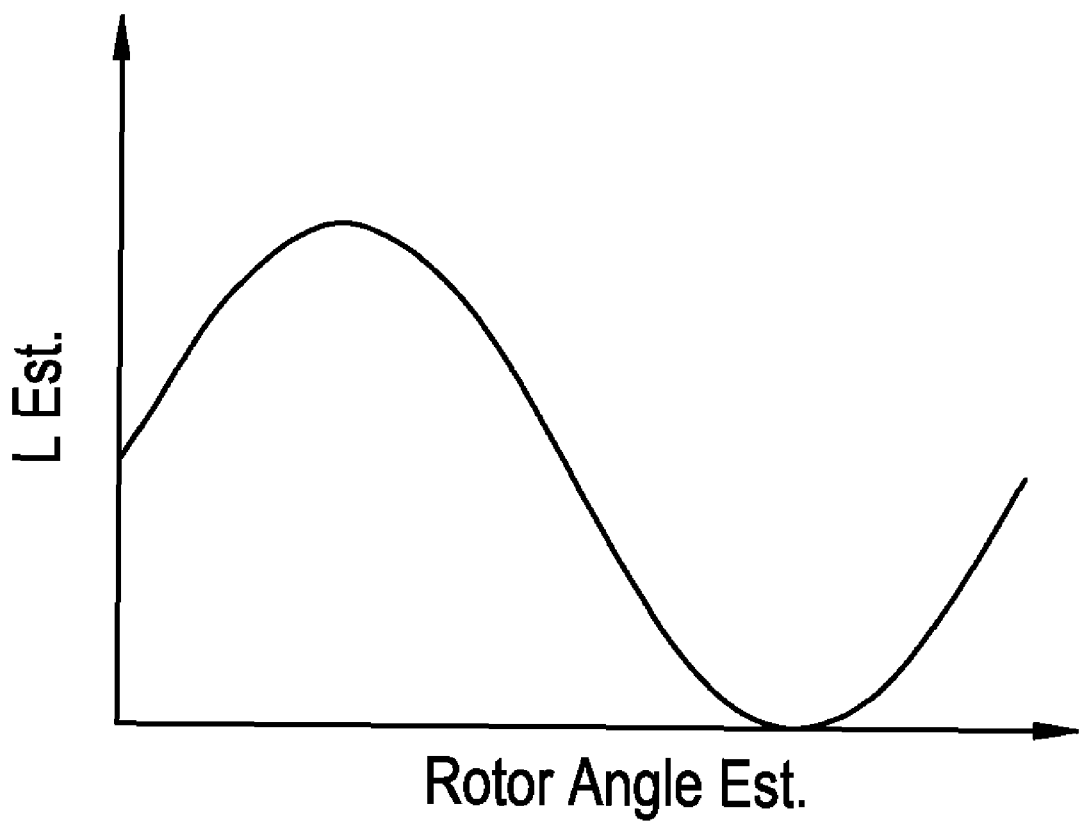
FIG. 3 illustrates an exemplary embodiment of a first lookup array function.

The first look up array function is a function of the estimated inductance and the angular position of the rotor 104. FIG. 3 illustrates an exemplary embodiment of the first lookup array function 301. The function 301 is a sinusoidal function (The Sinusoidal function is a non-limiting example. Other describing functions may be used that better fit a change in inductance reducing the modeling error, further improvement may be beneficial, for example, consideration of the mean current in the phase and proper cancellation of the errors predicted from this effect may be predicted.) where the vertical axis represents an estimated inductance and the horizontal axis represents the estimated angular position of the rotor 104 at a given estimated inductance. The estimated angular position of the rotor 104 may be determined by inputting an estimated inductance. Referring to FIG. 2, block 202 outputs an incremental inductance angle estimate signal 201.

The method described above, allows the angular position of the rotor 104 to be estimated without a high machine terminal voltage present in the machine 101. The pulse width modulated signal results in measurable voltages and currents in the stator 102 allowing a determination of incremental inductance in the stator 102. Inputting the incremental inductance into a function results in an estimated angular position of the rotor 104.

FIG. 2 also includes a traditional method for calculating an estimated angular position of the rotor 104 using back eFlux. By using the estimated angular position of the rotor 104 from the incremental inductance described above, and the estimated angular position of the rotor 104 from the back eFlux, an estimated angular position of the rotor 104 may be calculated that has improved accuracy while the machine 101 is operating in a variety of conditions.

Referring to FIG. 2, when the machine 101 (of FIG. 1) is operating at a speed that induces back eFlux, voltages and currents in the stator may be measured to determine back eFlux in the machine 101. Currents in the stator associated with the alpha and beta axes (I Stator a and I Stator b) are input to blocks 206 where a derivative is taken. The inductance is calculated in blocks 208. The inductance is added to the resistance of the stator 210. The resultant values are subtracted from measured voltages associated with the alpha and beta axes (V Stator a and V Stator b) resulting in back eFlux values (eFlux, a and eFlux, b). The arc tangent is taken in block 212 of the eFlux, a and eFlux b values resulting in an estimated angular rotor position signal from back eFlux signal 203. One example method of implementing the aTan function is through a phase lock loop.

Figure 5:
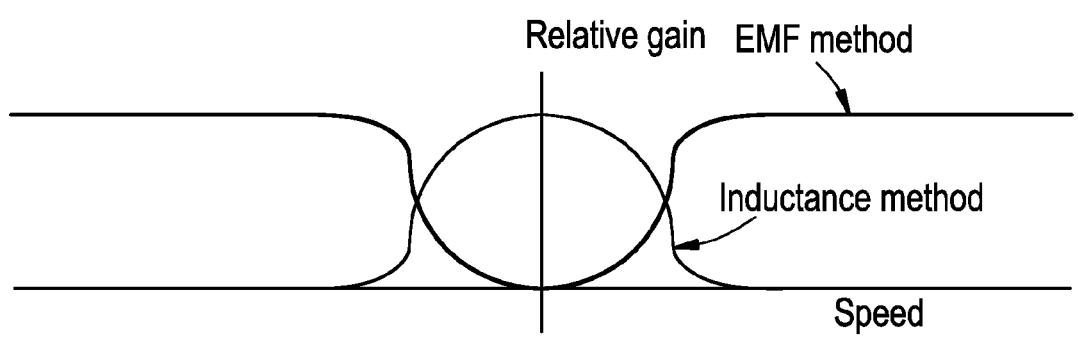
FIG. 5 illustrates an exemplary embodiment of a second lookup array function.

The incremental inductance angle estimate signal 201 and the estimated angular rotor position signal from back eFlux signal 203 are used in a second look up array function in block 204 along with machine and connection parameters to calculate an estimated angular rotor position 205. FIG. 5 illustrates an example of the second look up array function.

Many attributes contribute to the confidence in angle prediction in either of the methods described above. Some attributes, such as, for example, a level of excitation in an induction or a separately excited machine may deliberately alter the both of the relative gains.

By using both the incremental inductance angle estimate signal 201 and the estimated angular rotor position signal from back eFlux signal 203 to calculate the estimated angular rotor position 205, an accurate estimate of the angular rotor position 205 of the rotor 104 may be calculated when the machine 101 is operating in a stationary condition, a low speed condition, and a high speed condition. An accurate estimate of the angular rotor position 205 of the rotor 104 results in improved operation and control of the machine 101.

This written description uses examples to disclose the invention, including the best mode, and also to practice the invention, including making and using any devices or systems and performing any incorporated methods. The patentable scope of the invention is defined by the claims, and may include other examples. Such other examples are intended to be within the scope of the claims if they have structural elements that do not differ from the literal language of the claims, or if they include equivalent structural elements with insubstantial differences from the literal languages of the claims.

What is claimed:

1. A method for determining rotor position comprising:
   sending a signal to a stator;
   receiving a first signal indicative of a first estimated stator inductance;
   receiving a second signal indicative of a second estimated stator inductance; and
   calculating a first rotor position angle using a function including the first estimated stator inductance and the second estimated stator inductance.

2. The method of claim 1, wherein the method further comprises:
   measuring a first voltage in the stator;
   measuring a change in a first current in the stator;
   measuring a second voltage in the stator;
   measuring a change in a second current in the stator;
   dividing the first voltage by the change in the first current to define the first stator inductance value; and
   dividing the second voltage by the change in the second current to define the second stator inductance value.

3. The method of claim 1, wherein the signal is a pulse width modulated signal.

4. The method of claim 1, wherein the function includes a sinusoidal function associated with the first stator inductance value.

5. The method of claim 1, wherein the function includes a sinusoidal function associated with the second stator inductance value.

6. The method of claim 1, wherein the method further comprises:
   determining a first back electromagnetic flux in the stator;
   determining a second back electromagnetic flux in the stator; and
   calculating a second rotor position angle from a function of the first back electromagnetic flux and the second back electromagnetic flux.

7. The method of claim 6, wherein the method further comprises:
   measuring a third voltage in the stator;
   measuring a third current in the stator;
   defining the first back electromagnetic flux in the stator as a function of the third voltage and the third current;
   measuring a fourth voltage in the stator;
   measuring a fourth current in the stator; and
   defining the second back electromagnetic flux in the stator as a function of the fourth voltage and the fourth current.

8. The method of claim 6, wherein the method further comprises calculating a third rotor position angle as a function of the first rotor position angle and the second rotor position angle.

9. An electrical machine system comprising:

a stator; and a controller operative to send a signal to a stator, and receive a first signal indicative of a first estimated stator inductance, receive a second signal indicative of a second estimated stator inductance, and calculate a first rotor position angle using a function including the first estimated stator inductance and the second estimated stator inductance.

10. The system of claim 9, wherein the controller is further operative to measure a first voltage in the stator, measure a change in a first current in the stator, measure a second voltage in the stator, measure a change in a second current in the stator, divide the first voltage by the change in the first current to define the first stator inductance value, and divide the second voltage by the change in the second current to define the second stator inductance value.

11. The system of claim 9, wherein the signal is a pulse width modulated signal.

12. The system of claim 9, wherein the function includes a sinusoidal function associated with the first stator inductance value.

13. The system of claim 9, wherein the function includes a sinusoidal function associated with the second stator inductance value.

14. The system of claim 9, wherein the controller is further operative to determine a first back electromagnetic flux in the stator, determine a second back electromagnetic flux in the stator, and calculate a second rotor position angle from a function of the first back electromagnetic flux and the second back electromagnetic flux.

15. The system of claim 14, wherein the controller is further operative to measure a third voltage in the stator, measure a third current in the stator, define the first back electromagnetic flux in the stator as a function of the third voltage and the third current, measure a fourth voltage in the stator, measure a fourth current in the stator, and define the second back electromagnetic flux in the stator as a function of the fourth voltage and the fourth current.

16. The system of claim 14, wherein the controller is further operative to calculate a third rotor position angle as a function of the first rotor position angle and the second rotor position angle.

* * * * *